Nov. 13, 1934.                P. S. JENKINS                1,980,721
               PANELBOARD AND TESTING MEANS THEREFOR
                    Filed June 4, 1928          2 Sheets-Sheet 2
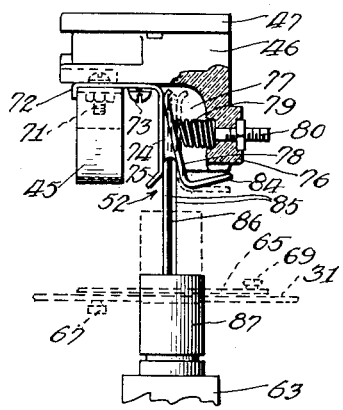
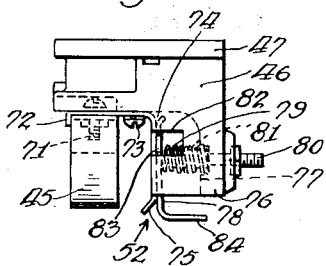
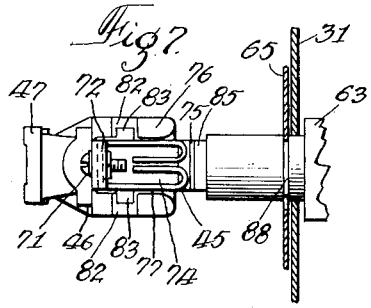
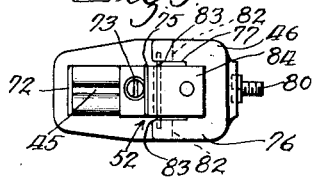
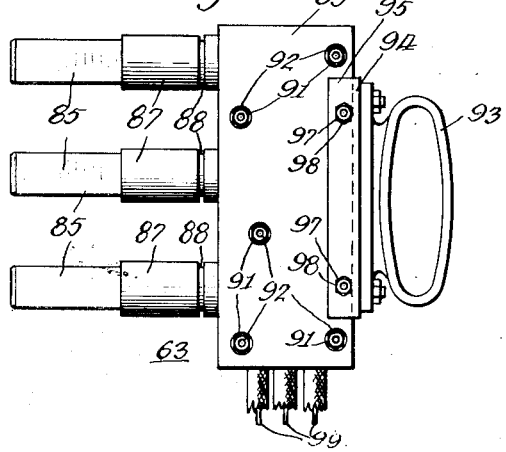
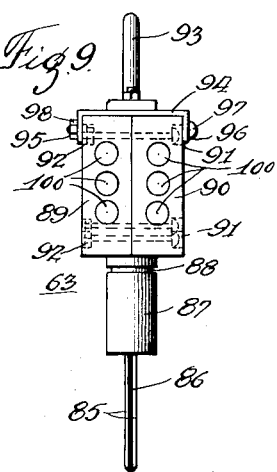
Inventor:
Paul S. Jenkins
By Jones, Addington, Ames & Seibold
Attys.

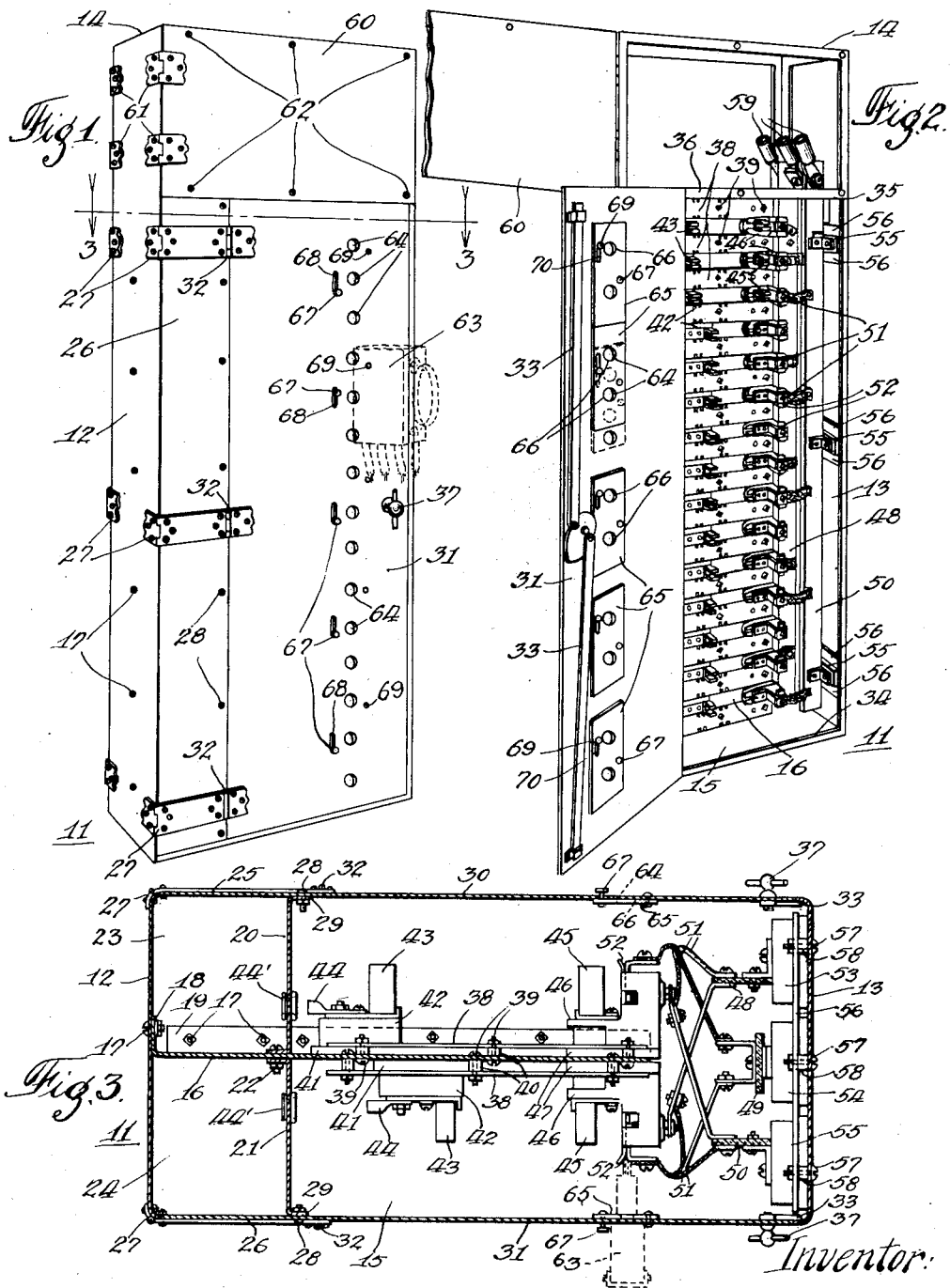

Patented Nov. 13, 1934

1,980,721

UNITED STATES PATENT OFFICE 1,980,721

PANELBOARD AND TESTING MEANS THEREFOR

Paul S. Jenkins, Detroit, Mich., assignor to Square D Company, Detroit, Mich., a corporation of Michigan Application June 4, 1928, Serial No. 282,557

2 Claims. (Cl. 175—183)

This invention relates to a panelboard and testing means therefor, and it has particular relation to an enclosed duplex panelboard and test jacks and plugs for use in conjunction therewith.

Co-pending application Serial No. 397,261 filed July 19, 1920, by A. P. Ball, and assigned to the assignee of the present application, discloses a novel form of unit base construction and mounting for electrical apparatus; and application, Serial No. 623,356, filed March 7, 1923, by A. P. Ball, and application Serial No. 17,525, filed March 23, 1925, by R. R. Eckenrode and L. B. Bogardus, also assigned to the assignee of the present application, are also related to this type of apparatus.

The present invention contemplates the utilization of unit base members for mounting electrical apparatus in accordance with the broad invention disclosed in the above-mentioned applications, and the particular embodiment of the present invention, as disclosed herein, utilizes notched strips for holding each of the unit base members in any one of a plurality of predetermined positions, whereby the panelboard on which these units are mounted is readily convertible to accommodate circuits of various desired current carrying capacities and voltage ratings.

This construction is in accordance with the invention disclosed in application Serial No. 227,465, filed October 20, 1927, by J. A. Widmer, and also assigned to the assignee of the present application.

The particular panelboard disclosed herein is also similar to that disclosed in the last above-mentioned co-pending application in that it is so constructed as to provide means permitting ready access to the electrical devices, such as fuses or the like, which are mounted on the panelboard, and to provide wiring ducts or chambers for the conductors that are to be connected to such devices, which chambers are also accessible for the purpose of installing or removing the conductors, as desired.

The panelboard of the present invention, however, is constructed in duplex form, having electrical devices mounted on both sides of the panelboard itself, which devices are accessible from opposite sides of the panelboard casing. Respective wiring ducts or chambers are provided in the casing for the electrical devices mounted on the two sides of the panelboard.

This duplex construction affords a considerable economy in regard to the amount of space required, and also provides a construction which is more simple and economical to construct than are the devices heretofore commonly used for this purpose.

The panelboard herein disclosed is also particularly adapted to be provided with testing means, in accordance with the present invention, such means being adapted to be inserted through the walls or doors of the casing without the necessity of opening such doors or disturbing the circuits to be tested in any way. For the purpose of permitting the accomplishment of this result, the casing is provided with openings for the reception of test plugs, and means for normally closing these openings are also provided.

The closing means are so arranged that they may be manually actuated from the outside of the casing to the proper positions to permit the insertion of the test plugs through the holes in the casing. When the test plugs are thus inserted, the closing means further function to lock the same in position, thereby preventing inadvertent removal of the test plugs.

The test jacks which are mounted on the panelboard for cooperation with the test plugs, as above indicated, are of such form and arrangement that meters or other testing means may be readily connected in circuit with any of the various branch circuits of the panelboard without interrupting the flow of current in such circuit, even momentarily.

The principal object of the present invention, therefore, is to provide an enclosed panelboard that is readily convertible to accommodate circuits of various current carrying capacities and voltage ratings, and that is so constructed as to effect the maximum economy of space and to permit testing of the circuits accommodated by the panelboard in a very ready manner.

The invention will be better understood from the following detailed description and the accompanying drawings, in which:

Figure 1 is a perspective view of an enclosed panelboard embodying my invention with the doors thereof in closed position;

Fig. 2 is a perspective view, similar to Fig. 1, but with certain of the doors in open position;

Fig. 3 is a view partly in top plan and partly in section, taken along the line 3—3 of Fig. 1;

Fig. 4 is a top plan view of a test jack embodied in the present invention;

Fig. 5 is a front elevational view of the test jacks shown in Fig. 4;

Fig. 6 is a view similar to Fig. 4 showing the manner in which the test plug of the present invention is inserted in operative relation to the test jack without interrupting the electrical circuit therethrough; certain of the parts being broken away in this view to give a clear understanding of the construction and operation of the apparatus;

Fig. 7 is an end elevational view of the test jack shown in Figs. 4 and 5 with the test plug of the present invention inserted in operative relation thereto; this view also showing a section of one of the doors of the panelboard casing through which the test plug is inserted and a portion of a slidable plate mounted on said door to close the openings therethrough under normal conditions and to lock the test plug in its proper position when the same is inserted through the holes in the door;

Fig. 8 is a side elevational view of a test plug embodying a portion of the present invention; and Fig. 9 is a bottom plan view of the device shown in Fig. 8.

Referring, first, to Figs. 1, 2 and 3 of the drawings, a panelboard casing 11 is shown as comprising side wall portions 12 and 13 and top and bottom wall portions 14 and 15, respectively. A partition and panelboard member 16 extends from the side wall 12 in substantially perpendicular relation thereto toward the side wall 13, but terminates a substantial distance short of the latter side wall. The partition and panelboard member 16 is held in position within the casing by bolts or screws 17 passing through flange portions 18 and 19 of this member and through the side wall 12 and bottom wall 15, respectively, of the casing.

Partition members 20 and 21 extend from the panelboard member 16, to which they are attached by bolts or screws 22, outwardly in opposite directions, and in substantially parallel relation to the side wall 12 of the casing, thus forming two wiring ducts or chambers 23 and 24. The ducts 23 and 24 are closed on the outer sides thereof by doors 25 and 26, respectively, which doors are connected to the side wall 12 of the casing by hinge members 27. The doors 25 and 26 are normally secured in closed positions by bolts or screws 28 which extend through the doors near the edges thereof, and also extend through flange portions 29 at the outer extremities of the partition members 20 and 21.

Doors 30 and 31 are connected by hinges 32 to the edges of the doors 25 and 26, respectively, and extend across the remaining portions of the sides of the casing to form a complete closure therefor. It will be noted that the hinges 27 and 32 are shown as having a common plate portion secured to the doors 25 and 26. This construction has been found to be economical and to give certain advantages, but it will be understood, of course, that separate hinges may be utilized, if desired.

Each of these doors is provided with latching means 33 adapted to cooperate with a flange portion 34 that is turned outwardly from the bottom wall 15 of the casing, and a similar flange portion 35 that is turned downwardly from a horizontally extending partition 36 at the top of the panelboard compartments. The latching means 33 are provided with suitable manually operable handles 37, whereby the doors 30 and 31 may be readily opened to permit access to the electrical devices mounted on the respective sides of the panelboard member 16.

The horizontal extending partition 36 is disposed in spaced relation to the top wall 14 of the casing to provide a wiring chamber for the conductors to be connected to the main bus bars of the panelboard, as hereinafter described.

Notched metallic strips 38 are secured to the panelboard member 16 by bolts or screws 39 and are maintained in spaced relation to the contact devices by spacing members or washers 40. The edges of the strips 38 overlie peripheral flange portions 41 of unit base members 42, and the notches in these strips cooperate with suitable lugs on these unit base members to maintain the latter in desired longitudinally spaced positions on the faces of the panelboard member 16. This type of unit base mounting is described in detail in copending application Serial No. 227,465, filed October 20, 1927, hereinbefore referred to. Suitable electrical contact devices 43, such as fuse jaws or clips, and electrical terminal members 44 connected to the respective contact devices 43, are mounted on the outer faces of the unit base members 42 in accordance with the inventions of the several above-mentioned co-pending applications.

Suitable conductors may be connected to the terminal members 44 and may extend through suitable bushings 44' in the partitions 20 and 21 into the wiring ducts or chambers 23 and 24 whence these conductors or conductors connected thereby may be led out to various branch circuits or electrical apparatus in any desired manner.

The electrical contact devices 43 are adapted to cooperate with similar devices 45 that are mounted on the outer faces of unit base members 46, the latter unit base members being of a particular construction adapted for the purposes of the present invention. The unit base members 46 comprise peripheral flange portions 47 at the bases thereof, which flange portions are engaged by the strips 38 to clamp the unit base members 46 firmly in position on the faces of the panelboard member 16 in the same manner that the unit base members 42 are so clamped, and lugs may be provided on the sides of the base members 46 to cooperate with notches in the strips 38, also in the manner described with respect to the unit base members 42, and in accordance with the invention of the above-mentioned co-pending application.

Electrical circuit connection is made between the contact devices 45 and main bus bars 48, 49 and 50 by means of flexible conductors 51, the details of construction of the unit base members 46 and the electrical conducting members mounted thereon through which this circuit connection is completed being described hereinafter in connection with other figures of the drawings. It may be stated, however, that the conducting devices mounted on the base members 46 comprise test jacks generally designated as 52 for a purpose hereinafter to be described.

The main bus bars 48, 49 and 50 are respectively mounted on unit base members 53, 54 and 55 that are similar in construction to the unit base members 42. The base members 53, 54 and 55 are clamped to the inside of the side wall 13 of the casing by notched strips 56, which are of similar construction to the strips 38 and are similarly fastened in position with respect to the wall 13 by means of bolts or screws 57 and spacing members 58. The arrangement of the main bus bars in the manner shown and described permits electrical circuit connections to be made between the several bus bars and the conducting members mounted on the unit base members 46 on either side of the panelboard member 16, and is one of the novel features of my invention which I hereafter claim.

The bus bars 48, 49 and 50 extend upwardly through suitable openings in the partition 36, and are provided, at their upper extremities, with terminal members 59 disposed within the wiring chamber or compartment between the partition 36 and the upper wall 14 of the casing. Suitable circuit connections may be made to the bus bars 48, 49 and 50 through the terminal members 59 within this wiring compartment, and the conductors forming such connections may be led outwardly from this compartment in any desired manner and direction.

It is to be noted that this main wiring compartment is normally closed by doors 60 that are connected by hinge members 61 to the wall 12 of the casing, and are adapted to be held in closed position by screws or bolts 62 passing through these doors and through the flange 35, and a similar flange depending from the top wall 14 of the casing. The screws or bolts 62 may be removed to permit access to the main wiring chamber from either side thereof, as desired, by opening the corresponding one of the two doors 60.

The test jacks 52 are constructed to receive test plugs of a form hereinafter shown and described, which form of plug is indicated in dotted lines in Figs. 1 and 3 of the drawings, and there generally designated as 63. Said test plug 63 comprises projecting blades adapted to be inserted into contact-making relation with the test jacks 52 for the purpose of measuring desired electrical characteristics of the branch circuits connected through these test jacks.

For the purpose of permitting such insertion without any inconvenience or danger to the person performing this operation, a plurality of holes 64 are provided in the doors 30 and 31 of the casing, these holes being respectively positioned to be in alignment with the several test jacks 52 when the doors 30 and 31 are in closed position. Since the particular panelboard disclosed herein is shown as being connected to a three wire electrical system embodying three main bus bars and three conductors in each branch circuit, the holes 64 are arranged in groups of three and the three holes of each group are arranged in alignment with the three test jacks of the corresponding branch circuit on the panelboard. It is obvious, however, that the holes 64 may be arranged in groups of two, or other numbers, if circuits of different numbers of conductors each are connected through the apparatus mounted on the panelboard, and that test plugs having a corresponding number of projecting conducting portions may be utilized.

The holes 64 in the doors 30 and 31 are normally closed on the inner sides of such doors by slidable closure plates 65, each of which has two holes 66 therein. A pin 67 is secured to each of the closure plates 65, and projects outwardly through a vertically disposed slot 68 in the door on which the closure plate is mounted. Said pins 67 constitute handles, whereby the corresponding closure plates may be manipulated from outside of the casing. The plates 65 are also supported by pins 69 that are secured to the doors 30 and 31 and project inwardly therefrom through vertically disposed slots 70 in the closure plates. The inner extremities of the pins 69 are headed over to prevent displacement of the plates with respect to the doors on which they are mounted.

When one of the pins 67 is lifted, the corresponding plate slides upwardly on its supporting pin 69 to bring the two holes 66 into alignment with the upper two holes of the group of three holes normally closed by this plate. During this operation, the pin 67 rides upwardly in the slot 68 in which it is freely slidable, as is also the fixed pin 69 with respect to the slot 70 in the closure plate. It will be understood that in the normal position of the closure plate 65, each of the holes 64 in the corresponding group is covered by the material at either side of the two holes 66 in the closure plate.

When the plate is lifted in the manner described, the material between the lower one of the two holes 66 and the bottom of the plate uncovers the lower one of the three holes 64 in the corresponding group, and the two holes 66 are moved into alignment with the upper two holes 64 in the same group to permit the ready insertion of the three projecting portions of the test plug through the three holes in the door that are thus uncovered. The next to the top plate is shown in full lines in Fig. 2 in its lifted position, the normal position of the same being shown in dotted lines. The other plates in this figure are shown in normal position closing the holes 64. The pins 67 are shown in Fig. 1 in positions substantially corresponding to the position of the plates, as shown in Fig. 2.

Figs. 4, 5, 6 and 7 illustrate, in detail, the type of test jack generally designated as 52 in Figs. 2 and 3 of the drawings. Each of these test jacks, as previously set forth, comprises a unit base member 46 of insulating material, which is preferably molded to the desired form. The peripheral flange 47 at the base portion of this member is for the purpose of facilitating the mounting of the member on the panelboard, as previously set forth. The connecting device 45, such as a fuse clip or jaw-type fuse receptacle member, is secured by a bolt or screw 71 to a conducting member or strap 72, which, in turn, is fastened to the face of the base member 46 by a bolt or screw 73. The inner extremity of the strap 72 is bent outwardly from the base of the base member 46 to form a contactable portion 74, the outer extremity of which is again bent to form a lip portion 75 facilitating the insertion of a test plug into operative relation to the connecting device of the test jack, as will be hereinafter described more fully.

The extremity of the base member 46 opposite that at which the connecting device 45 is mounted, comprises an outwardly extending integral portion 76 having a cavity 77 therein for the reception of a movable contact member 78. This movable contact member is normally maintained by a coiled spring 79 in co-terminal flush and contact-making relation to the contact portion 74, as best shown in Fig. 4. The spring 79 co-acts between one side of the contact member 78 and the opposite face of the cavity in 46. A stud 80 is secured to the outwardly-extending portion 76 of the base member 46 and comprises a head portion 81 disposed within the coiled spring 79 and serving as a guide to prevent displacement of said spring.

The side walls of the cavity 77 are provided with slots 82 within which outwardly extending portions of the contact member 78 are adapted to be disposed to prevent undesired displacement of this contact member. It will be apparent that this construction permits movement of the contact member 78 away from the contact member 74 against the pressure exerted by the coiled spring 79. Movement of the contact member 78 in this direction is permitted by the construction, including the slots 82 and the outwardly extending portions 83 of the contact member 78, but the contact member 78 cannot be moved in any other direction, as for example, to remove the same entirely from its operative position with respect to the base member 46, except by removing the screw or bolt 73 to permit the strap 72, including the contact portion 74, to be first removed. This construction provides for a very ready and rapid manner of assembly of the test jack, without requiring the use of any special tools, and also provides a compact and efficient device of the character desired.

The outer extremity of the contact member 78 is bent away from the contact portion 74 to provide a terminal portion 84 to which the flexible conductors 51 are attached, as shown in Figs. 2 and 3. The desirability of using flexible conductors for making these connections is now apparent, inasmuch as the contact member 78 is being susceptible of a certain amount of movement with respect to its mounting. This contact receiving structure is another desirable feature of my invention which I hereinafter claim.

Fig. 6 shows the manner in which the contact portions of the test plug 63 are inserted in contact-making relation to the contact members 74 and 78. As shown in this figure, the contacting portions of the test plug 63 comprise two projecting contact blades 85 separated by a sheet of insulating material 86. The extremities of the contact blades 85 are suitably rounded to facilitate entry thereof between the contact members 74 and 78.

The outwardly bent portions 75 of the contact member 74 serve to guide the contact blades 85 of the test jack into position whereby they will readily push the contact member 78 away from the contact member 74 against the pressure of the spring 79 when the test plug is pushed inwardly from outside the casing. The mounting of the contact member 78 is such that the contact blades 85 make complete contact with the contact members 74 and 78, respectively, before the latter contact members are separated.

This result is accomplished by a rocking action of the contact member 78 in which its innermost portion maintains contact with the corresponding portion of the contact member 74 until the contact blades 85 of the test plug have been inserted to such position that they make complete contact with the contact members 74 and 78, respectively. The position of the contact members 78 at an intermediate point with respect to the insertion of the test plug 63 is shown in full lines in Fig. 6, the dotted lines in this figure indicating the position assumed by the contact member 78 when the test plug 63 has been inserted to its final operative position for the making of desired testing operation.

It will be understood, in connection with the hereinafter detailed description of the construction and method of utilization of the test plug 63, that the several contact blades 85 thereof are connected to suitable measuring instruments, whereby a circuit through such instruments is completed before the contact members 74 and 75 are separated, thus insuring absolute continuity of connection through the test jacks therein when the contacting portions of the test plug are inserted therein.

Fig. 6 also shows, in dotted lines, a portion of the door 31 through the holes 64 in which the contacting portions of the test plug 63 are inserted, as above described. This figure also shows, in dotted lines, the cover plate 65 which is moved to the desired position by means of the outwardly projecting pin 67 to permit the insertion of the contacting portions of the test plug through said holes 64.

It is to be noted in this figure, that the contact blades 85 project outwardly from cylindrical portion 83 of insulating material, which, in turn, project outwardly from one face of the test plug 63, as will be better understood hereinafter. The length or projection of the insulating portion 87 from the body of the test plug 63 is such that the outer extremities of these insulating portions will have passed through the holes 64 in the door 31 before the ends of the contact blades 85 come into contact with the contact members 74 and 78. In this manner, all danger of short circuits or accidental grounds, which might occur if the contact blades 85 are permitted to touch any of the metallic parts of the panelboard casing after these blades have come into contact with the contact members 74 and 78, is eliminated.

Fig. 7 of the drawings shows the test plug 63 fully inserted to the position in which testing operations are to be performed. It will be observed that in this position the body of the test plug 63 is in relatively close proximity to the outer surface of the door 61. An annular slot or groove 88 in each of the cylindrical insulating portions 87 permits the closure plate 65 to move downwardly a slight distance by the action of gravity into such position that the test plug 63 is locked in its operative position when it is actuated to such position by inserting the contacting portions of the same through the holes 64.

The cylindrical insulating portions 87 are of substantially the same diameter as the holes 64 to provide a snug fit for guiding the contact blades 85 accurately into the test jacks 52 that are in alignment with the holes 64 through which the contacting portions of the test plug are inserted, and to cooperate with the closure plate 65 to maintain the plug firmly in its operative position, as shown in Fig. 7. To remove the plug, after the desired testing operations have been performed, it is simply necessary to lift the closure plate 65 by manipulating the corresponding pin 67 and to release the plate 65 from engagement with the edge of the slot 88. The plug may then be freely withdrawn by means of a handle, the construction and arrangement of which will be described presently.

Referring to Figs. 8 and 9 of the drawings, it will be seen that the test plug 63 comprises a body portion consisting of two members 89 and 90 of insulating material secured together by bolts 91 and cooperating nuts 92. A handle 93 is secured to a projecting portion 94 having flanged portions 95 and 96, which overlie the outside edges of the two body members 89 and 90, respectively. Bolts 97 pass through the flanged portions 95 and 96 and the body portions 89 and 90, and are provided with cooperating nuts 98 for securing the projecting member 94 firmly to the body members 89 and 90.

The cylindrical insulating portions 87 are secured to the face of the body portion formed by the members 89 and 90 opposite the face to which the handle 93 is secured. The contact blades 85 extend inwardly from their outer projecting portions through the insulating members 87 into suitable cavities (not shown) between the two body members 89 and 90, and are adapted to be connected within such cavities to respective insulated conductors 99. The conductors 99 may be led outwardly from the cavities within the body portion of the test plug through holes 100 that are provided for that purpose.

It will be understood that an individual insulated conductor will be provided for each of the contact blades 85, which, in the case of the particular plug illustrated herein, would require the provision of six of the said conductors 99, the plug here shown comprising three contacting portions each of which includes two contact blades 85. Such a plug is suitable for testing any type of three wire circuit. As above stated, it will be obvious to those skilled in the art that plugs having different numbers of contacting portions may be provided for utilization with circuits comprising different numbers of conductors each.

In the utilization of the test plug embodied in the present invention, it will be understood that suitable instruments will be connected to the conductors 99 before the plug is inserted in the selected jacks for testing operations. The two conductors 99 which are, respectively, connected to the two contact blades 85, that are adapted to be inserted in a single test jack, will, of course, have connected therebetween a circuit of extremely low resistance, such as an ammeter coil or a current coil of a watt meter, or the like.

When all of the corresponding pairs of conductors 99 are provided with such low-resistance connections therebetween, there will be no interruption to the current traversal of a circuit of the test jacks into which the plug is inserted, this, by reason of the fact, as above stated, that the contact blades 85 make solid contact with the respective contact members 74 and 78 of the corresponding test jack before said contact members 74 and 78 are entirely separated.

In addition to the low resistance coils connected between the conductors 99 of each pair, voltage meter coils or watt meter potential coils may be connected to the conductors 99 of different pairs to obtain a measurement of the voltage between the several conductors of each circuit, as well as a measurement of the power traversing each current or portion thereof.

In actual practice, it has been found desirable to provide suitable indicia for each of the holes 100 to identify the conductor passing through said hole with the particular contact blades 85 to which such conductor is connected, the contact blades being provided with similar indicia.

From the foregoing description, it will be seen that the present invention provides an electrical panelboard which is most economical in its space requirements, and which is advantageously designed with respect to the manner in which the main circuit and branch circuit conductors may be connected to the devices mounted on the panelboard. The maximum degree of accessibility of all of the devices mounted on the panelboard is obtained, and by reason of the unit base mounting that is utilized the panelboard is readily convertible to adapt the same for circuits of any desired capacities and ratings; the testing means constituting a part of this invention are designed to permit the making of desired tests of the individual branch circuits with a minimum amount of labor, without any danger to the operator and without the necessity of interrupting the circuit that is to be tested therein momentarily, either while the test plug is being inserted, or while it is being removed.

While only one specific embodiment of the present invention has been shown and described herein, it will be understood that various changes and modifications in the details of structure and arrangement of the parts may be made without departing from the spirit and scope of the invention. This embodiment of the invention having been shown and described, therefore what is claimed as new is:

1. In combination, a panelboard casing, a plurality of circuit connecting devices mounted within said casing in groups respectively connected in a plurality of branch circuits, a test jack included in each of said circuit connecting devices, a door in said casing having holes therein respectively in alignment with said test jacks, a plurality of closure plates slidably mounted on said door and each adapted normally to close the holes in alignment with the test jacks of one of said branch circuits, a test plug having a number of contacting portions corresponding to the number of test jacks in each of said branch circuits, and means operable from outside the casing for moving said plates individually out of closing relation to said holes in the casing to permit the insertion of the contacting portions of the test plug through said holes into contact with the corresponding test jacks of any of said branch circuits, said test plug comprising a portion adapted to be automatically engaged by the closure plate for any of the groups of holes through which the contacting portions of said test plug are inserted to lock the test plug in operative position during testing operations.

2. In combination, a panelboard casing, a plurality of circuit connecting devices mounted within said casing in groups respectively connected in a plurality of branch circuits, a test jack included in each of said circuit connecting devices, a door in said casing having holes therein respectively in alignment with said test jacks, a plurality of closure plates slidably mounted on said door and each adapted normally to close the holes in alignment with the test jacks of one of said branch circuits, a test plug having a number of contacting portions corresponding to the number of test jacks in each of said branch circuits, and means operable from outside the casing for moving said plates individually out of closing relation to said holes in the casing to permit the insertion of the contacting portions of the test plug through said holes into contact with the corresponding test jacks of any of said branch circuits, said test plug having a slot therein adapted to be entered by the closure plate for any of the groups of holes through which the contacting portions of said test plug are inserted to lock the test plug in operative position during testing operations, such entering of the closure plate into said slot being effected by the action of gravity on said closure plate when the test plug is inserted in operative position for such operations.

PAUL S. JENKINS.